United States Patent
Mawatari et al.

(10) Patent No.: US 7,825,932 B2
(45) Date of Patent: *Nov. 2, 2010

(54) DATA DISPLAY SYSTEM, DATA RELAY DEVICE, DATA RELAY METHOD, DATA SYSTEM, SINK DEVICE, AND DATA READ METHOD

(75) Inventors: Masahiko Mawatari, Yokohama (JP); Yutaka Kawada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/453,168

(22) Filed: Apr. 30, 2009

(65) Prior Publication Data

US 2009/0244076 A1 Oct. 1, 2009

Related U.S. Application Data

(63) Continuation of application No. 11/332,149, filed on Jan. 17, 2006, now Pat. No. 7,667,706, which is a continuation of application No. 10/439,046, filed on May 16, 2003, now abandoned, which is a continuation of application No. PCT/JP03/01714, filed on Feb. 18, 2003.

(30) Foreign Application Priority Data

Feb. 19, 2002 (JP) ............................... 2002-041167

(51) Int. Cl.
*G06F 15/00* (2006.01)
*G06F 13/14* (2006.01)
*G06F 13/372* (2006.01)
*G09G 1/02* (2006.01)
*G09G 1/06* (2006.01)
*H04N 7/16* (2006.01)

(52) U.S. Cl. ...................... 345/501; 345/520; 345/534; 345/11; 345/27; 725/127

(58) Field of Classification Search ................. 345/501, 345/503, 520, 531, 534, 537, 11, 27, 28; 370/522; 725/127

See application file for complete search history.

(56) References Cited

U.S. PATENT DOCUMENTS 4,432,050 A 2/1984 Harris et al.

(Continued)

FOREIGN PATENT DOCUMENTS

EP 0 456 923 A1 11/1991

(Continued)

OTHER PUBLICATIONS

Implementation Guide of E-EDID (VESA Enhanced Extended Display Identification Data Standard) published by VESA (The Video Electronics Standard Association), pp. 1-32, (2000).

(Continued)

*Primary Examiner*—Ryan R Yang
(74) *Attorney, Agent, or Firm*—Finnegan, Henderson, Farabow, Garrett & Dunner, L.L.P.

(57) ABSTRACT

A repeater comprises an EDID memory to store a control data and a memory control unit. The memory control unit is configured to make access to the EDID memory to read the control data therefrom, store the read control data into the EDID memory and, when access is made to the EDID memory by the set-top box, transfer the control data stored in the EDID memory to the set-top box. In this case, the memory control unit outputs an inhibiting signal to a set-top box to inhibit it from making access to the EDID memory until the completion of an operation of storing the control data from the EDID memory in the set-top box into the EDID memory in the repeater.

1 Claim, 7 Drawing Sheets

U.S. PATENT DOCUMENTS

| | | | |
|---|---|---|---|
| 5,602,567 | A | 2/1997 | Kanno |
| 5,691,741 | A | 11/1997 | Kerigan et al. |
| 5,757,698 | A | 5/1998 | Sakaki |
| 5,910,806 | A | 6/1999 | Narui et al. |
| 5,943,029 | A | 8/1999 | Ross |
| 6,263,440 | B1 | 7/2001 | Pruett et al. |
| 6,331,950 | B1 | 12/2001 | Kuo et al. |
| 6,373,476 | B1 | 4/2002 | Dalgleish et al. |
| 6,433,785 | B1 | 8/2002 | Garcia et al. |
| 6,600,747 | B1 | 7/2003 | Sauber |
| 6,618,773 | B1 | 9/2003 | Chang et al. |
| 7,180,511 | B2 | 2/2007 | Shigeta |
| 2001/0030649 | A1 | 10/2001 | Mamiya et al. |
| 2001/0050679 | A1 | 12/2001 | Shigeta |
| 2002/0087278 | A1 | 7/2002 | Odaohhara |
| 2002/0089518 | A1 | 7/2002 | Shigeta |
| 2002/0113907 | A1 | 8/2002 | Endo et al. |
| 2003/0011605 | A1 | 1/2003 | Mullin |
| 2003/0025685 | A1 | 2/2003 | Shirasaki et al. |
| 2003/0052888 | A1 | 3/2003 | Rai |
| 2003/0169261 | A1 | 9/2003 | Emberling et al. |
| 2004/0039927 | A1 | 2/2004 | Hazama et al. |
| 2005/0012399 | A1 | 1/2005 | Yuji |
| 2006/0125832 | A1 | 6/2006 | Mawatari et al. |
| 2007/0016778 | A1 | 1/2007 | Lyle |
| 2007/0286246 | A1 | 12/2007 | Kobayashi |

FOREIGN PATENT DOCUMENTS

| | | |
|---|---|---|
| EP | 0 807 880 A1 | 11/1997 |
| EP | 0 896 318 A2 | 2/1999 |
| EP | 0 896 318 A3 | 2/1999 |
| JP | 7-302068 | 11/1995 |
| JP | 2635837 | 4/1997 |
| JP | 9-128182 | 5/1997 |
| JP | 9-128330 | 5/1997 |
| KR | 1999-0079978 | 11/1999 |
| WO | 02-06817 | 1/2002 |

OTHER PUBLICATIONS

Digital Visual Interface (DVI), Digital Display Working Group, pp. 1-76, (Apr. 1999).

Kabushiki Kaisha Toshiba, Translation of "Explanation of Circumstances Concerning Accelerated Examination", from International Application No. PCT/JP03/0714, pp. 1-15 and 1-18, (Apr. 2003).

"Multi-port Dynamic Random Access Memory Controller," IBM Technical Disclosure Bulletin, vol. 33, No. 12, pp. 375-377, May 1991.

B. Prince, "High Performance Memories," 1999, pp. 79-80.

Notice Requesting Submission of Opinion issued by the Korean Patent Office on Sep. 18, 2007, for Korean Patent Application No. 10-2005-7015486, and English-language translation thereof.

Notification of Reasons for Rejection issued by the Japanese Patent Office on Aug. 17, 2007, for Japanese Patent Application No. 2005-214752, and English-language translation thereof.

Korean Office Action dated May 25, 2006, in Korean Application No. 10-2005-7015486.

Kroah-Hartman, G., "Hot Plug", Linux Journal, Apr. 2002.

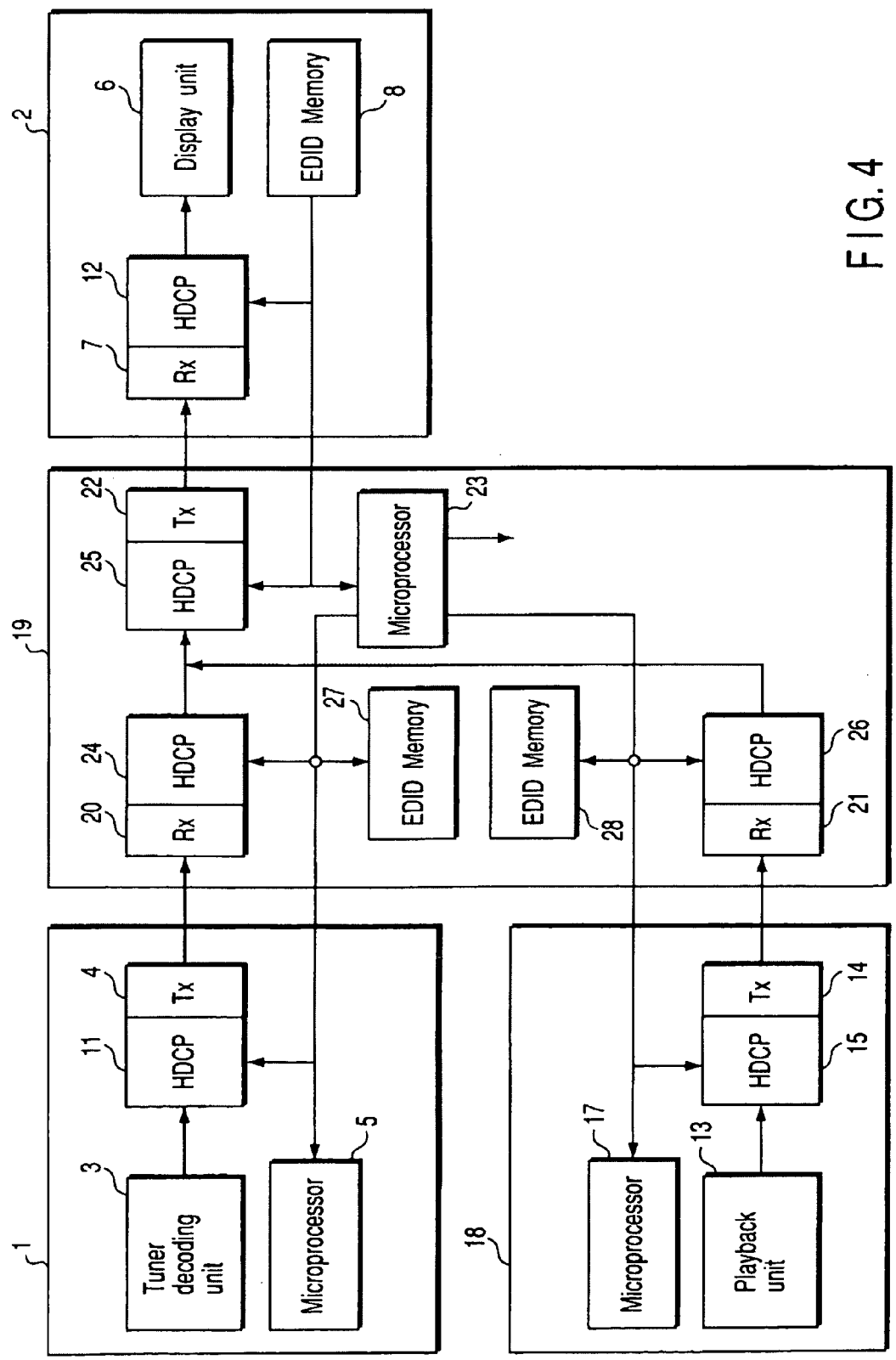
F I G. 4

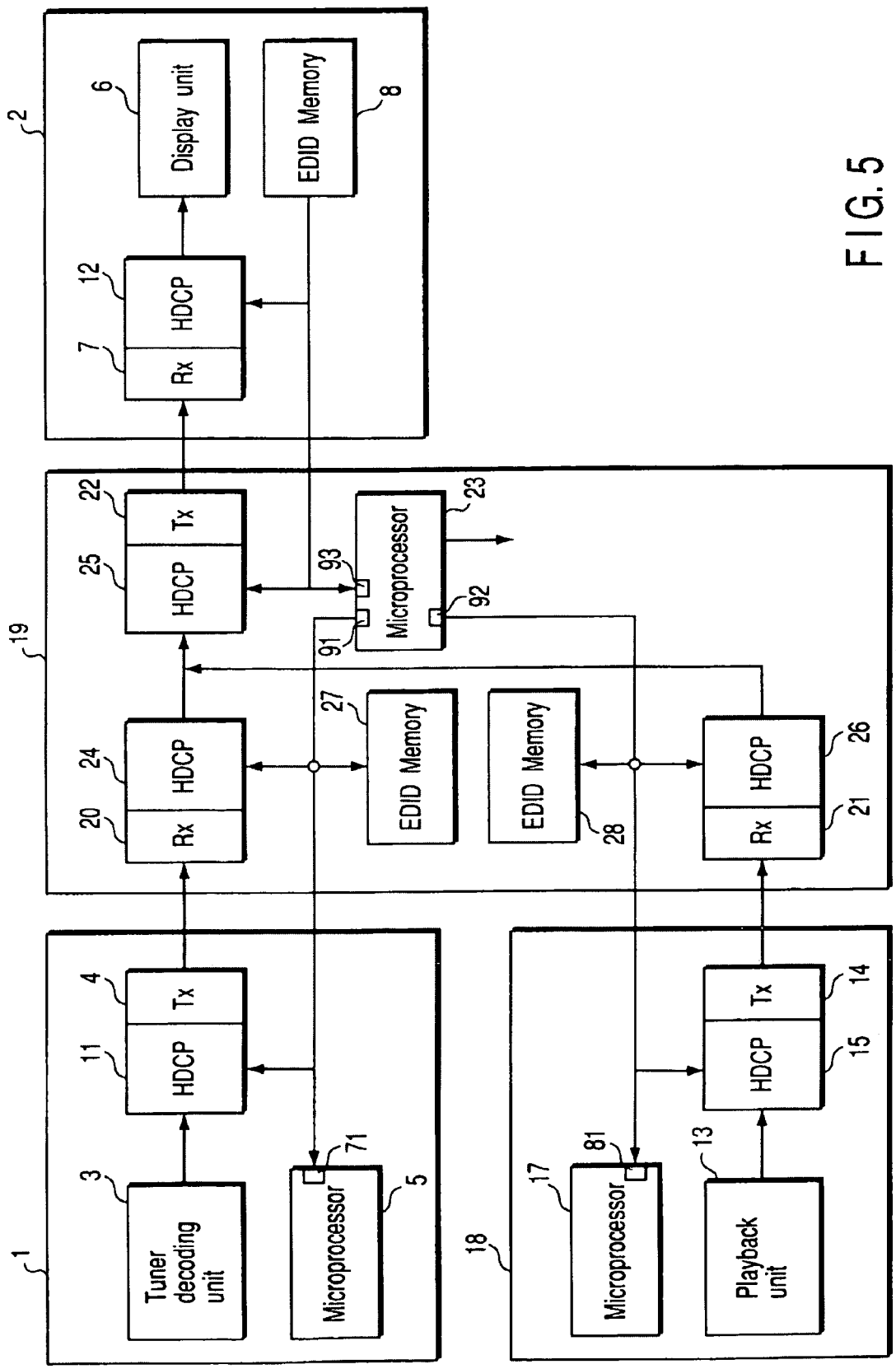
F I G. 5

DATA DISPLAY SYSTEM, DATA RELAY DEVICE, DATA RELAY METHOD, DATA SYSTEM, SINK DEVICE, AND DATA READ METHOD

CROSS-REFERENCE TO RELATED APPLICATIONS

This application is a continuation of application Ser. No. 11/332,149 filed Jan. 17, 2006 now U.S. Pat. No. 7,667,706, which is a continuation of application Ser. No. 10/439,046, filed May 16, 2003 now abandoned, which is a Continuation Application of PCT Application PCT/JP03/01714 filed Feb. 18, 2003, which was not published under PCT Article 21(2) in English, all of which are incorporated herein by reference. This application also claims the benefit of Japanese Patent Application No. 2002-041167, filed Feb. 19, 2002, the contents of which are incorporated herein by reference.

BACKGROUND OF THE INVENTION

1. Field of the Invention

The present invention relates to a data display system, a data relay device, a data relay method, a data system, a sink device and a data read method which are used in transmitting video data and audio data from a source to a display unit.

2. Description of the Related Art

A conventional data display system is disclosed, for example, in Japanese Patent No. 2635837 (issued on Jul. 30, 1997).

With this data display system, it is important that control data representing display attributes of a display terminal be transmitted from the display terminal to a source device.

BRIEF SUMMARY OF THE INVENTION

According to an aspect of the present invention, there is provided a data display system comprising: a display unit which stores control data representing display attributes; and a data relay device configured to make access to the display unit to read the control data therefrom, store the read control data into a first memory and, when access is made to the first memory by a first source device, transfer the read control data stored in the first memory to the first source device after the completion of storing the read control data from the display unit into the first memory.

According to another aspect of the present invention, there is provided a data relay device, provided between a display unit which stores control data representing display attributes and a first source device, comprising: a first memory configured to store the control data representing display attributes of the display unit; and a first control unit configured to make access to the display unit to read the control data therefrom, store the read control data into the first memory and, when access is made to the first memory by the first source device, transfer the read control data stored in the first memory to the first source device after the completion of storing the control data from the display unit into the first memory.

According to still another aspect of the present invention, there is provided a data relay method for relaying data between a display unit which stores control data representing display attributes and a first source device, comprising: making access to the display unit to read the control data therefrom; storing the read control data into a first memory; and in response to access to the first memory by the first source device, transferring the read control data stored in the first memory to the first source device after the completion of storing the control data from the display unit into the first memory.

According to still another aspect of the present invention, there is provided a data system characterized by comprising: a source device configured to output a digital signal; and a sink device which comprises a memory configured to store display identification data and transfers the display identification data stored in the memory to the source device after the completion of storing the display identification data, when access is made to the memory by the source device.

According to still another aspect of the present invention, there is provided a sink device characterized by comprising: a memory configured to store display identification data; and a control unit which inputs data from a source device and transfers the display identification data stored in the memory to the source device after the completion of storing the display identification data when access is made to the memory by the source device.

According to still another aspect of the present invention, there is provided a data read method comprising: writing data into a memory; and allowing a source device to read the data from the memory after the completion of writing the data into the memory.

According to still another aspect of the present invention, there is provided a data read method comprising: writing data into a memory; and prohibiting a source device from reading the data from the memory; allowing the source device to read the data from the memory, after the completion of writing the data into the memory.

BRIEF DESCRIPTION OF THE SEVERAL VIEWS OF THE DRAWING

FIG. 4 is a block diagram of a data display system in which an EDID data processing function is added to the data display system of FIG. 3 having a repeater between the graphics host and the digital display unit according to the embodiment;

FIG. 5 shows a digital display system in which microprocessors shown in FIG. 4 have memory control units built in according to the embodiment;

DETAILED DESCRIPTION OF THE INVENTION

A data display system according to an embodiment of the present invention will be described hereinafter with reference to the accompanying drawings.

The data display system is a computer system in which a data relay device (repeater) is interposed between a source device and a display unit.

In this data display system, the data relay device transfers control data to the source device. A decoding method is set in the source device by the control data.

Figure 1:
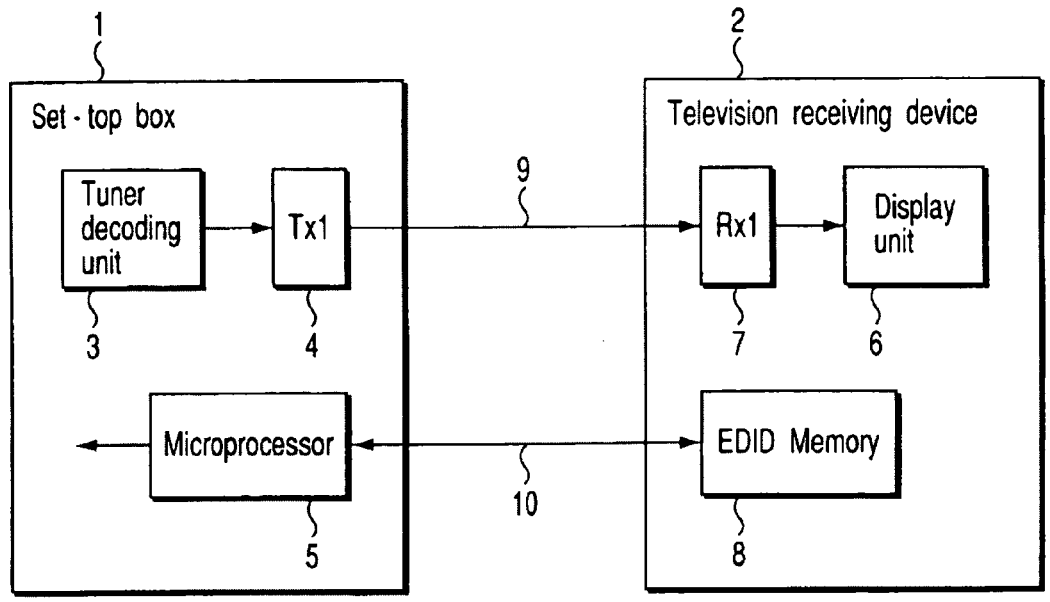
FIG. 1 is a diagram for use in explanation of a basic configuration of a data display system according to an embodiment of the present invention.

FIG. 1 is a diagram for use in explanation of a basic configuration of a data display system embodying the present invention. FIG. 1 shows the circuit configurations of a graphics host and a digital display unit that adopt the DVI (Digital Video Interactive) standard.

The DVI standard is one that allows high-speed serial digital transmission between the graphics host and the digital display unit. The DVI standard defines coding modes on the side of the graphics host, decoding modes on the side of the digital display unit, electrical characteristics of a transmitter Tx and a receiver Rx, etc.

The DVI standard further defines communications control modes that allow the graphics host to read EDID-standard control data stored in a digital display unit.

The data display system shown in FIG. 1 comprises a set-top box 1 and a television receiving device 2. The set-top box 1 is implemented, for example, by a cable or satellite broadcasting receiver as the graphics host. The television receiving device 2 displays broadcast video based on data from the set-top box 1. In FIG. 1, the set-top box 1 corresponds to the source device, and the television receiving device 2 corresponds to a sink device. The source device outputs a digital signal and an audio signal to the sink device.

A decoded digital video signal from a tuner decoding unit 3 in the set-top box 1 is converted into a high-speed serial digital signal by a transmitter 4, which is, in turn, transmitted over a digital transmission link 9 to the television receiving device 2.

In the television receiving device 2, a receiver 7 receives the high-speed serial digital signal and sends it to a display unit 6, which displays video based on the received digital video signal.

The DVI standard adopts the IIC communications bus standard (two-wire communications standard proposed by Philips). A microprocessor 5 in the set-top box 1 generates command signals. In addition, the microprocessor 5 contains communications logic to communicate control data on the basis of the command signals.

In the data display system shown in FIG. 1, the E-EDID (Enhanced Extended Display Identification Data) standard is defined. The E-EDID standard guarantees the compatibility of display units, such as digital displays, with source devices, such as personal computers, digital video players, etc.

Control data based on the EDID standard are defined as data representing display attributes of digital display units that are connected to personal computers, digital video disk players, etc.

An EDID memory 8 stores control data representing the display attributes of the display unit. Specifically, the control data includes data representing forms of the video signal and data representing forms of the audio signal.

The data representing the forms of the video signal include a resolution, a video frame period, the number of pixels, the number of lines, a signal form (RGB signal or brightness/color difference signal form), etc. The data representing the forms of the audio signal include the number of sampled bits in audio data, a sampling frequency, the number of channels corresponding to the number of speakers, etc.

The control data is used in setting a decoding system on the source device side. If the control data value were acquired by the source device in error, the source device would malfunction.

The control data stored in the EDID memory 8 is read by the microprocessor 5 in the set-top box 1. Based on display attribute data contained in the control data, specifications of view angles (the number of horizontal pixels, the number of vertical lines, etc.) and decoding parameters, such as the frame frequency, etc., of video signals are set in the tuner decoding unit 3.

In the data display system shown in FIG. 1, in order to prevent the storage of video signals, scramble processing is performed on the video signals. A standard that defines such scramble processing is the HDCP (High-band Digital Content Protection) standard.

The HDCP standard defines the scramble/descramble processing of a video signal and the delivery of a shared key in digital transmission of the video signal between the graphics host and the digital display unit.

The DVI standard recommends the HDCP standard as a technique to encipher and decipher video signals.

For the delivery of a shared key defined by the HDCP standard, a communications control bus 10 of FIG. 1 is used.

Figure 2:
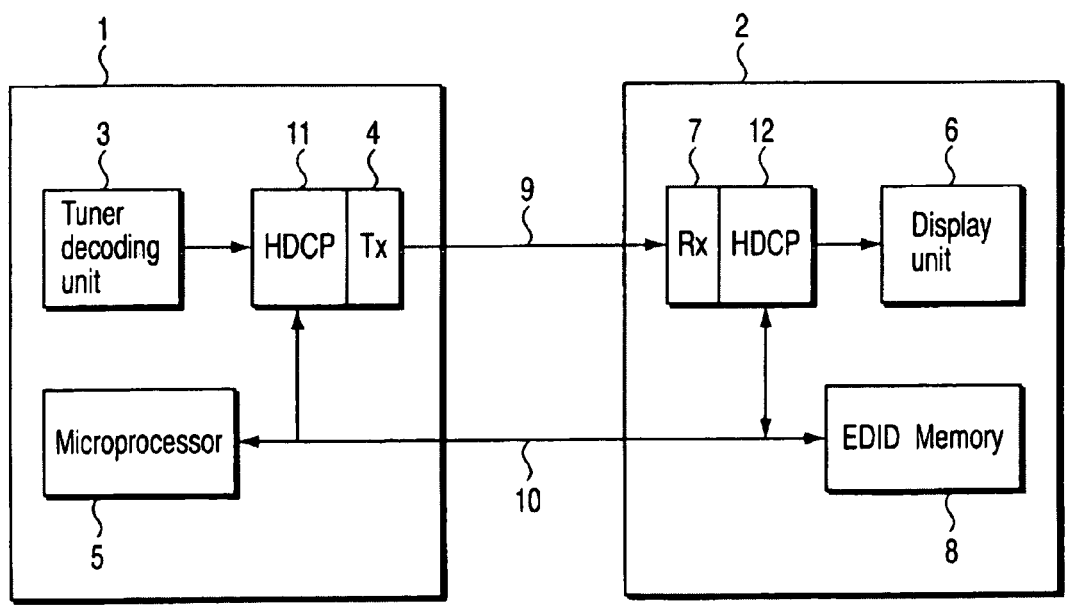
FIG. 2 is a block diagram of a system in which a scrambler and a descrambler that conform to HDCP standards are applied to the circuit blocks of FIG. 1 according to the embodiment.

FIG. 2 is a block diagram of a system in which a scrambler and a descrambler that conform to the HDCP standard are applied to the circuit blocks of FIG. 1. In FIG. 2, the corresponding components to those in FIG. 1 are denoted by like reference numerals and detailed descriptions thereof are omitted.

A digital video signal decoded in the tuner decoding unit 3 of the set-top box 1 is enciphered in an HDCP scrambler 11. The resulting enciphered data is converted into a high-speed serial digital signal in the transmitter 4. The high-speed serial digital signal is transmitted over the digital transmission link 9 to the television receiving device 2.

In the television receiving device 2, the receiver 7 receives the high-speed serial digital signal. An HDCP descrambler 12 converts the received signal into the original digital video signal, which is transferred to the display unit 6.

The delivery of the shared key used in the cipher process by the HDCP scrambler 11 and in the decipher process by the HDCP descrambler 12 is carried out through the communications control bus 10.

The HDCP standard defines a repeater as the data relay device provided on the transmission link between a source device and a digital display unit and its associated functions.

An example of connecting two or more graphics hosts to a digital display unit will be described with reference to FIG. 3.

A repeater 19 is provided between two graphics hosts of the set-top box 1 and a digital videodisk (DVD) player 18 and the television receiving device 2.

The DVD player 18 comprises a microprocessor 17, a playback unit 13, a transmitter 14, and an HDCP scrambler 15. The data transmitting operation between the DVD player 18 and the repeater 19 is substantially the same as that between the set-top box 1 and the repeater 19 and hence detailed description thereof is omitted.

In the repeater 19, two receivers 20 and 21 are provided in correspondence with the two graphics hosts. The receiver 20 receives a high-speed serial digital signal from the set-top box 1, while the receiver 21 receives a high-speed serial digital signal from the DVD player 18.

In the repeater 19, an HDCP descrambler 24 deciphers the high-speed serial digital signal (enciphered signal) received by the receiver 20, while an HDCP descrambler 26 deciphers the high-speed serial digital signal (enciphered signal) received by the receiver 21.

In the repeater 19, an HDCP scrambler 25 enciphers the video signal which has been deciphered by either of the HDCP descramblers 24 and 25.

A transmitter 22 converts the enciphered video signal into the high-speed serial digital signal and then transmits it to the television receiving device 2.

Figure 3:
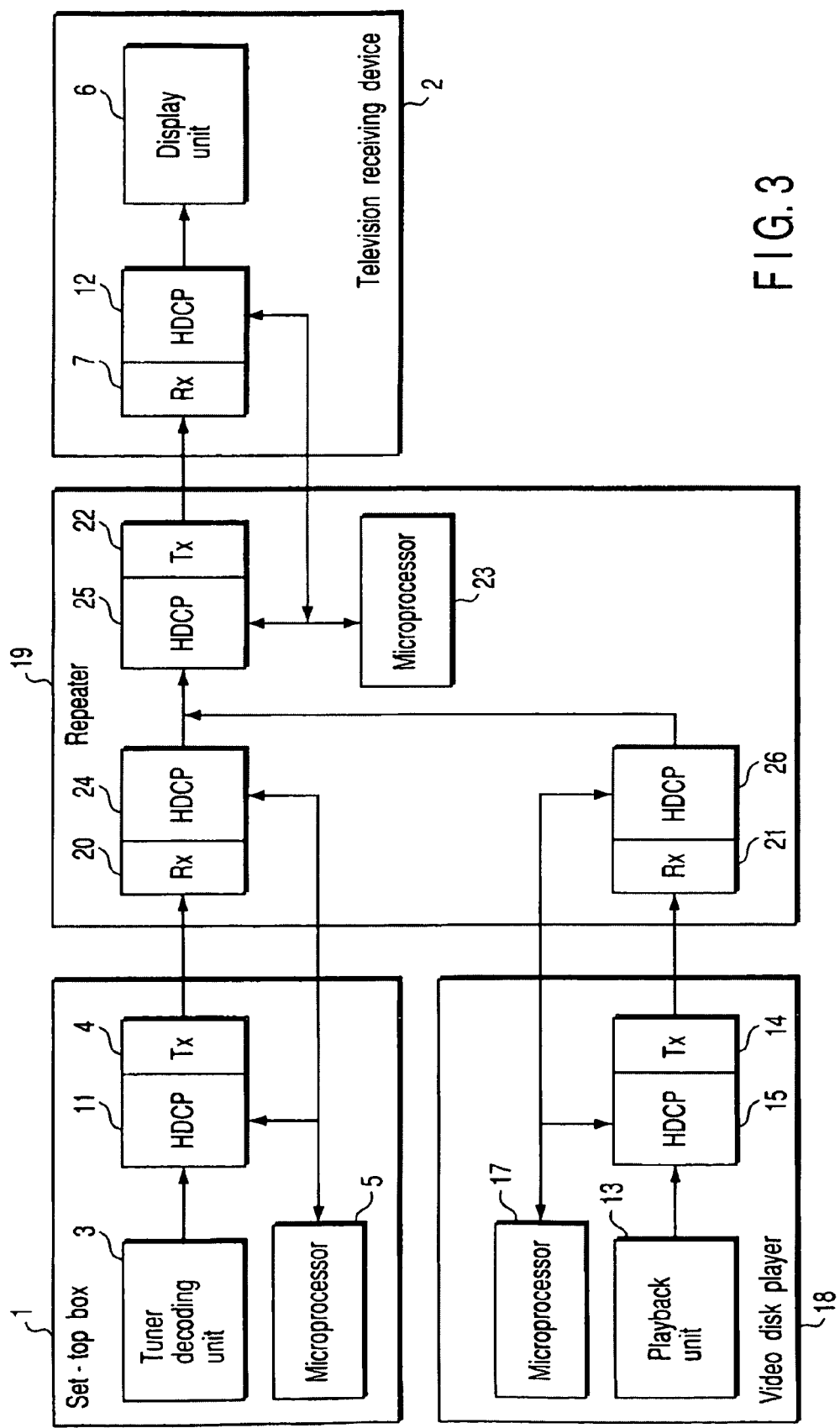
FIG. 3 shows an example of connecting a plurality of graphics hosts to a digital display unit according to the embodiment.

In FIG. 3, the set-top box 1 corresponds to the source device, and the television receiving device 2 corresponds to the sink device as well as FIG. 1. While the repeater 19 is the source device in relation to the set-top box 1, the repeater 19 is the sink device in relation to the television receiving device 2.

In an alternative embodiment, the tuner decoding unit 3 can be contained in the repeater 19. In this case, the configuration in which the data relay device having the repeater function is provided between the DVD player 18 and the digital display unit is common to the above embodiment.

An application of the aforementioned EDID-standard control data to the data display system shown in FIG. 3 will be described below.

FIG. 4 is a block diagram of a data display system in which an EDID data processing function is added to the data display system of FIG. 3 having the repeater between the graphics hosts and the digital display unit. In FIG. 4, the corresponding components to those in FIG. 3 are denoted by like reference numerals and detailed descriptions thereof are omitted.

In the case of the aforementioned DVI standard, no repeater is defined and it is not supposed that a system uses the repeater. Likewise, with the HDCP standard, it is not defined to process EDID-standard control data. When a repeater is used, it is required to keep constant conditions for transmitting/receiving data between a source device and the repeater and between the repeater and a display unit so that the data is transmitted correctly between each component.

In order to satisfy this requirement, a memory for transferring the EDID-standard control data stored in the digital display unit and storing the EDID-standard control data is provided in the repeater 19 interposed between the source device and the digital display unit.

With this approach, the control data is buffered in the memory in the repeater 19. This buffering allows EDID-standard control data to be transmitted to the source device.

The repeater 19 shown in FIG. 4 is provided with the transmitter 22 and the receivers 20 and 21. In the repeater 19 there are further provided EDID memories 27 and 28 for storing the EDID-standard control data stored in the EDID memory 8 of the television receiving device 2.

In the repeater 19, the microprocessor 23 reads the EDID-standard control data from the memory 8 in the television receiving device 2 and then stores it into the EDID memories 27 and 28.

The set-top box 1 on the source device side makes access to the EDID memory 27. Likewise, the DVD player 18 on the source device side makes access to the EDID memory 28. Thus, the source devices can acquire the EDID-standard control data stored in the television receiving device 2. As a result, data is transmitted correctly over the transmission links.

With the system configuration of FIG. 4, however, it is not determined in what sequence the power of each equipment is turned on.

For example, the microprocessor 5 in the set-top box 1 may make access to the EDID memory 27 to read the control data while or before the microprocessor 23 is writing or writes data read from the EDID memory 8 in the television receiving device 2 into the EDID memory 27. In such a case, the read data may differ from values the EDID memory 8 stores.

If the read data differ from the control data in the EDID memory 8 in the television receiving device 2, the microprocessor 5 in the set-top box 1 may set the tuner decoding unit 3 in accordance with wrong parameters that do not conform to the actual display attributes of the display unit 6.

In that case, erroneously decoded signals will be sent to the television receiving device 2. The television receiving device 2 however cannot display a video signal in that decoded form. As a result, the displayed images on the display unit 6 will become disturbed.

In order to solve that problem, a data display system as shown in FIG. 5 is used. The data display system is designed such that the microprocessors shown in FIG. 4 have memory control units built in to control reading from and writing into the EDID memories.

More specifically, the microprocessor 5 has a memory control unit 71 to control the EDID memory 27. The microprocessor 17 has a memory control unit 81 to control the EDID memory 28. The microprocessor 23 has a memory control unit 91 to control the EDID memory 27, a memory control unit 92 to control the EDID memory 28, and a memory control unit 93 to control the EDID memory 8.

The EDID memory 27 is controlled by the two memory control units 71 and 91, thereby a multimaster mode is realized. The EDID memory 28 is controlled by the two memory control units 81 and 92, thereby a multimaster mode is realized.

Thus, each EDID memory is controlled by one or two memory control units. Thereby, access to the EDID memories 27 and 28 in the repeater 19 by the source device is prohibited until the completion of an operation of writing control data into those memories 27 and 28.

The interconnection relationship among components in the data display system of FIG. 5 will be described with reference to FIG. 6.

Figure 6:
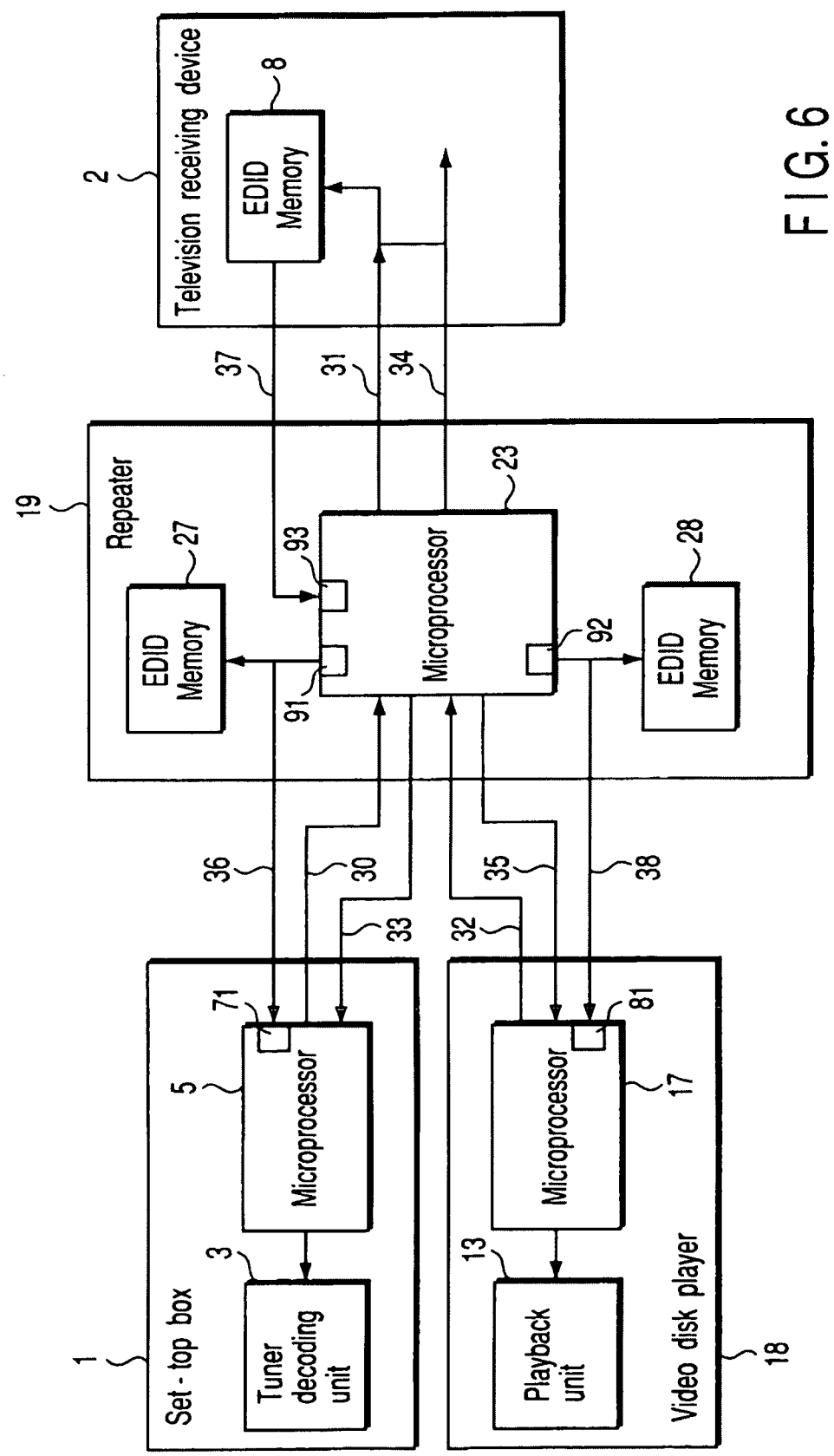
FIG. 6 is a diagram for use in explanation of detailed interconnection relationships in the data display system of FIG. 5 according to the embodiment.

As shown in FIG. 6, the repeater 19 is connected with the set-top box 1, the DVD player 18, and the television receiving device 2 through connectors and cables defined by the DVI standard.

The set-top box 1 and the repeater 19 are connected together by an IIC bus 36, a power-on line 30, and a hot plug line 33. The IIC bus 36, which is a bidirectional bus, connects the memory control unit 71 of the microprocessor 5, the memory control unit 91 of the microprocessor 23, and the EDID memory 27. The power-on line 30 connects the microprocessor 5 and the microprocessor 23 to indicate the state of the set-top box 1. The hot plug line 33 connects the microprocessor 5 and the microprocessor 23 to indicate the state of the repeater 19.

The DVD player 18 and the repeater 19 are connected together by an IIC bus 38, a power-on line 32, and a hot plug line 35. The IIC bus 38 connects the memory control unit 81 of the microprocessor 17, the memory control unit 92 of the microprocessor 23, and the EDID memory 28. The power-on line 32 connects the microprocessor 17 and the microprocessor 23 to indicate the state of the DVD player 18. The hot plug line 35 connects the microprocessor 17 and the microprocessor 23 to indicate the state of the repeater 19.

The television receiving device 2 and the repeater 19 are connected together by an IIC bus 37, a power-on line 31, and a hot plug line 34. The IIC bus 37 connects the memory control unit 93 of the microprocessor 23 and the EDID memory 8. The power-on line 31 connects the microprocessor 23 and the EDID memory 8 to indicate the state of the repeater 19. The hot plug line 34 connects the microprocessor 23 and the EDID memory 8 to indicate the state of the television receiving device 2.

The interconnection relationship among the set-top box 1, the DVD player 18, the repeater 19 and the television receiving device 2 is not limited to the aforementioned example. In the above interconnection relationship, the power-on line 31 of the television receiving device 2 is connected with the hot plug line 34. The power-on line 31 and the hot plug line 34 are connected with the EDID memory 8. In the EDID memory 8, EDID data including information concerning the display attributes of the television receiving device 2 is stored.

Each of the microprocessors 5, 17 and 23 is a circuit block for system status detection and control.

Figure 7:
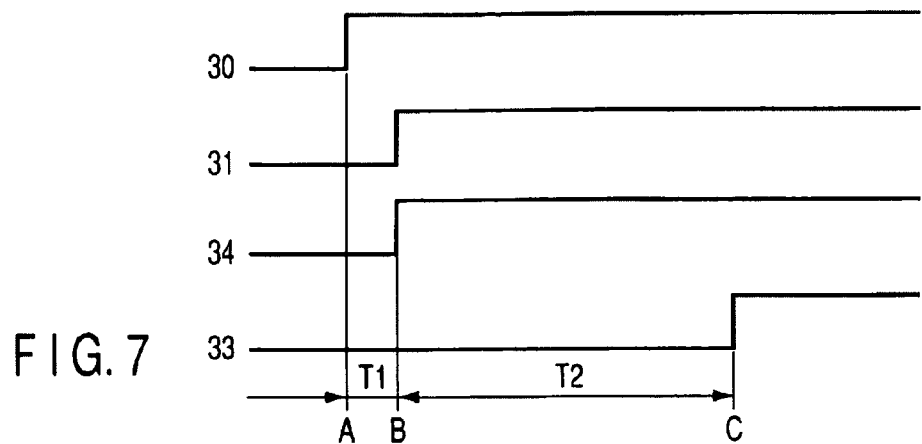
FIG. 7 is a timing diagram explanatory of the operation of the data display system of FIG. 6 according to the embodiment.

The operation of the data display system of FIG. 6 will be described below with reference to FIG. 7, which illustrates the states of signals transmitted and received between the set-top box 1 and the repeater 19 and between the repeater 19 and the television receiving device 2.

First, at time A, the power is applied to the set-top box 1, which causes the power-on line 30 to go active.

The microprocessor 23 in the repeater 19 detects the power state of the set-top box 1 and then causes the power-on line 31 on the television receiving device 2 side to go active at time B after a lapse of T1 from time A.

Thereby, the EDID memory 8 in the television receiving device 2 is supplied with the power from the repeater 19. At the same time, the state of power supply to the EDID memory 8 is transferred to the microprocessor 23 in the repeater 19 via the hot plug line 34. At time B, the microprocessor 23 keeps the hot plug line 33 inactive. The hot plug line 33 is adapted to inform the set-box 1 of the state of the repeater 19. In this state, the memory control unit 93 of the microprocessor 23 commences to read data from the EDID memory 8.

The memory control unit 91 of the microprocessor 23 stores control data read from the EDID memory 8 by the memory control unit 93 into the EDID memory 27 during a time interval T2 after time B. During this storing process, the microprocessor 5 in the set-top box 1 detects the inactive state of the hot plug line 33. Thus, the microprocessor 5 stops access to the EDID memory 27 and brings the operation of setting decoding display parameters in the tuner decoding unit 3 and the high-speed digital transmission operation to stopped state.

At the termination of the process of storing the EDID control data into the EDID memory 27, the microprocessor 23 causes the hot plug line 33 to go active at time C, thereby informing the set-top box 1 of the termination of the storing process.

By the hot plug line 33 going high, the microprocessor 5 in the set-top box 1 can recognize that the receiving end is ready to receive data.

Subsequent to time C, data transmissions based on DVI, EDID and HDCP standards are carried out.

The memory control unit 71 in the microprocessor 5 makes access to the EDID memory 27 to obtain the EDID control data. The microprocessor 5 controls the tuner decoding unit 3 on the basis of that EDID control data.

In the present embodiment, the microprocessor 5 (memory control unit 8) of the set-top box 1 is prohibited from making access to the EDID memory 27 in the repeater 19 during the time interval T2 when the EDID control data read from the EDID memory 8 is stored into the EDID memory 27.

Figure 8:
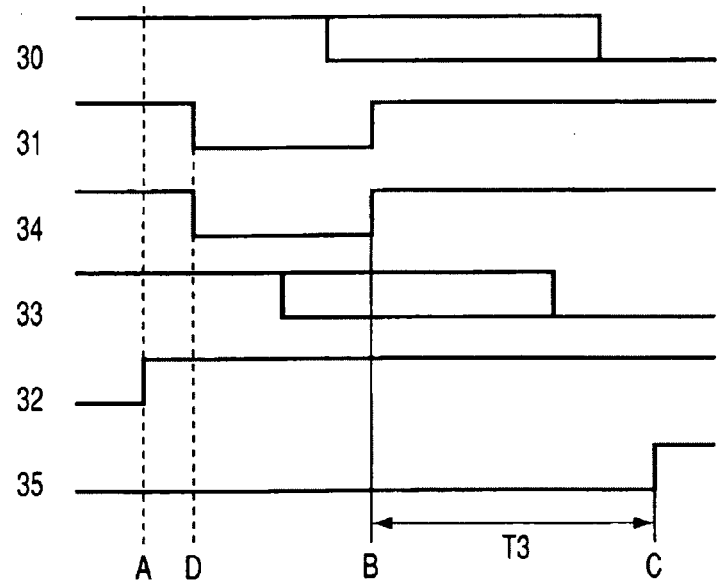
FIG. 8 is a timing diagram explanatory of the operation of the data display system of FIG. 6 when the two graphics hosts are sequentially enabled to transmit digital signals according to the embodiment.

Reference is now made to FIG. 8 to describe sequential transmission of digital signals from two graphics hosts. FIG. 8 is a timing diagram illustrating the states of signals transmitted and received between the DVD player 18 and the repeater 19 and between the repeater 19 and the television receiving device 2.

In FIG. 8, a digital signal is first transmitted from the set-top box 1 through the repeater 19 to the television receiving device 2 and then the television receiving device 2 becomes enabled to receive a digital signal from the DVD player 18 through the repeater 19.

When the power is applied to the DVD player 18 connected to the repeater 19, the power-on line 32 goes active at time A as shown in FIG. 8. The microprocessor 23 in the repeater 19 detects the active state of that line and then causes the power-on line 31 to the television receiving device 2 to go inactive at time D after the lapse of a predetermined time from time A. The hot plug line 34 is also caused to go inactive substantially the same time the power-on line 31 goes inactive, which allows the microprocessor 23 to detect that the television receiving device 2 has been reset. Thereby, the data transmission from the set-top box 1 to the television receiving device 2 is interrupted.

The microprocessor 23 causes the power-on line 31 to go active at time B after the lapse of a predetermined time from time D. Thereby, the power to the EDID memory 8 is supplied from the repeater 19. The memory control unit 93 of the microprocessor 23 reads the control data from the EDID memory 8 during a time interval T3 beginning at time B. The memory control unit 92 of the microprocessor 23 stores the read control data into the EDID memory 28 in the repeater 19 during the time interval T3.

During the time interval T3 the microprocessor 17 in the DVD player 18 detects that the hot plug line 35 is in the inactive state. Thus, the memory control unit 81 of the microprocessor 17 stops access to the EDID memory 28.

At the termination of the process of storing the EDID control data into the EDID memory 28, the microprocessor 23 in the repeater 19 causes the hot plug line 35 to go active at time C, which informs the DVD player 18 of the termination of that storing process. When the hot plug line 35 goes active, the microprocessor 17 in the DVD player 18 can determine that the receiving end is ready to receive data.

The memory control unit 81 of the microprocessor 17 in the DVD player 17 makes access to the EDID memory 28 to obtain the EDID control data. The microprocessor 17 controls the playback unit 13 on the basis of the EDID control data.

In the example of FIG. 8, the microprocessor 17 is prohibited from making access to the EDID memory 18 in the repeater 19 during the time interval T3.

Figure 9:
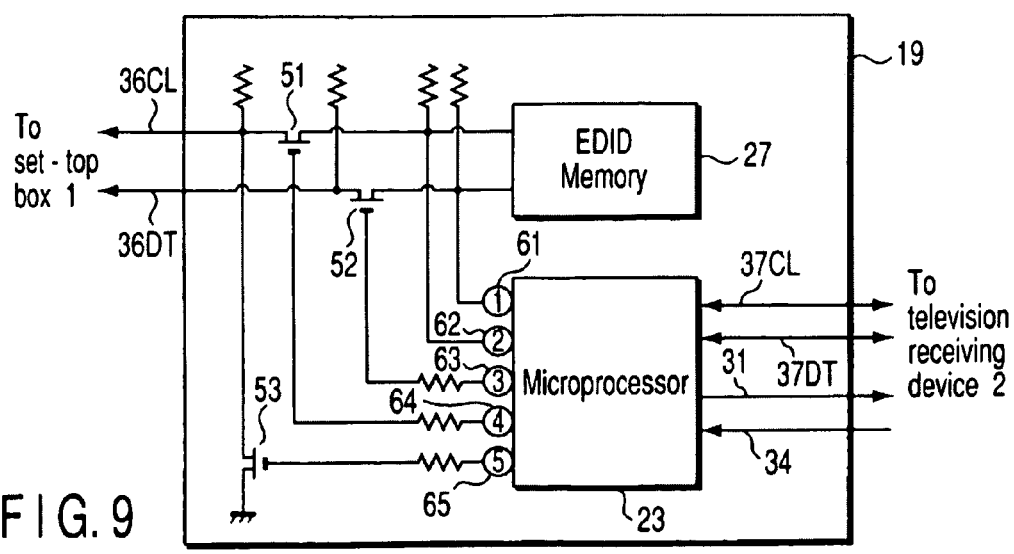
FIG. 9 shows the detailed configuration of the repeater according to the embodiment.

FIG. 9 shows detailed circuit block diagram of the repeater 19. In FIG. 9, the interconnection relationship between the repeater 19 and the DVD player 18 is omitted for convenience of explanation. The function of the repeater 19 shown in FIG. 9 will be described below in terms of a case where the microprocessor 5 in the set-top box 1 reads control data from the EDID memory 27 in the repeater 19. More specifically, the communication of control data between the microprocessor 5 and the EDID memory 27 using a serial link is stopped during the time when control data is written into the EDID memory 27 by the microprocessor 23 in the repeater 19.

The serial link over which control data is transmitted is a communications bus based on the IIC bus standard. The serial link comprises two communications lines: a serial transfer clock line 36CL in the IIC bus 36, and a serial data line 36DT in the IIC bus 36.

With the IIC bus standard, the clock source side acts as a master, while the other equipment acts as a slave. The master writes or reads data into or from the slave.

In the clock line 36CL and the serial data line 36DT of the IIC bus 36, the master and slave are driven by an open drain state. Resistance values are set so that the logic level becomes the H (High) level only when both the master and the slave go into the non-driving state.

Suppose that, when the master specifies a certain address to the slave, the slave generates an acknowledgment. In this case, if a normal acknowledgment were not issued from the slave, no transition to the next writing or reading stage would take place.

In the case of equipment slow in operating speed, the time between the fall and rise of clock can be made slower than a standard rate to make communications. By utilizing this time, the communicating operation of the serial data line 36DT can be stopped.

Transistors 51 and 52 acts as switching elements. To disconnect the master and the slave, the transistors 51 and 52 are simply turned off. Specifically, terminals 63 and 64 of the microprocessors 23 are set to a low level.

Thus, by rendering the transistors 51 and 52 nonconductive, the slave will make no response to any request made by the master. As a result, the master is placed in the waiting state. In this case, the slave corresponds to the microprocessor 23 in the repeater 19, while the master corresponds to the microprocessor 5 in the set-top box 1.

While the IIC bus 36 is nonconductive, the microprocessor 23 in the repeater 19 reads control data from the EDID memory 8. This control data reading is carried out through the serial link comprising a clock line 37CL and a serial data line 37DT of the IIC bus 37. The microprocessor 23 writes the read control data into the EDID memory 27 through its terminals 61 and 62 on the basis of the IIC bus standard.

At the termination of this write operation, the microprocessor 23 sets the terminals 61 and 62 open. Next, the microprocessor 23 sets its terminals 63 and 64 high. Thereby, the transistors 51 and 52 are turned on, rendering the clock line 36CL and the serial data line 36 of the IIC bus 35 conductive. As a result, the control data can be read from the EDID memory 27.

By setting the terminal 65 of the microprocessor 23 to the H level, the transistor 53 is turned on. Thereby, the clock line CL of the IIC bus 36 is set to the L level, which allows communications between the master and the slave to be stopped with certainty. That is, the microprocessor 5 in the set-top box 1 acting as the master is prohibited from making access to the EDID memory 27 in the repeater 19 acting as the slave.

In this case, the function of the memory control unit is implemented by a program or circuit incorporated into the microprocessor 23, the terminals of that microprocessor, and circuit components such as switching transistors, etc.

Thus, it becomes possible to prohibit the master from making access to the memory on the slave side by attaching the switching elements that control the connection between the master and the slave to the IIC bus and incorporating the function of controlling the switching elements into the slave. Although transistors are used as the switching elements, this is merely exemplary. Other types of switching elements may be used.

The function of the memory control unit may be implemented by other means than the aforementioned transistors, terminals, and program. For example, the microprocessor 23 may be configured to output a write inhibiting signal to the EDID memory 27 to thereby set that memory 27 to be write inhibited. To implement the memory control unit, hardware, software and firmware may be used individually or in combination.

Although, in the examples of FIGS. 1 to 9, a single repeater 19 as a data relay device is provided between the set-top box 1 or the DVD player 19 as a graphics host and the television receiving device 2, the embodiment is not limited to this. Two or more data relay devices may be placed between the graphics host and the receiving device.

Figure 10:
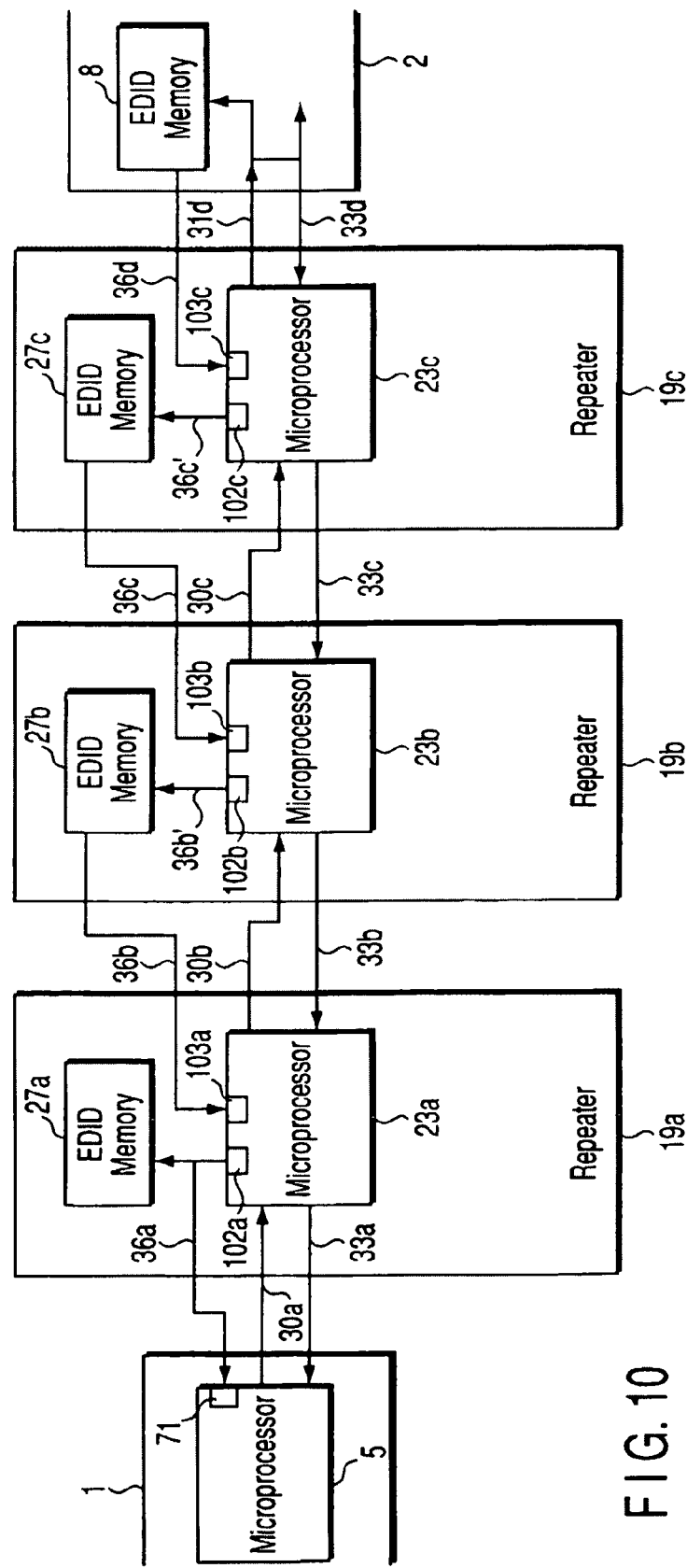
FIG. 10 is a block diagram of a data display system in which a plurality of repeaters are connected in cascade according to the embodiment.

FIG. 10 is a block diagram of a data display system in which repeaters are placed in multistage configuration. In FIG. 10, corresponding components to those in FIGS. 2 to 9 are denoted by like reference numerals and detailed descriptions thereof are omitted.

Three repeaters 19a, 19b and 19c are placed between the set-top box 1 and the television receiving device 2 to connect them. Each of these repeaters may be any type of equipment, such as a DVD player, a VTR, a television receiving device, etc., provided that it has a microprocessor and an EDID memory.

The set-top box 1 is the source device in relation to the repeater 19a. The repeater 19a is the sink device in relation to the set-top box 1, while the repeater 19a is the source device in relation to the repeater 19b. The repeater 19b is the sink device in relation to the repeater 19a, while the repeater 19b is the source device in relation to the repeater 19c. The repeater 19c is the sink device in relation to the repeater 19b, while the repeater 19c is the source device in relation to the television receiving device 2.

The repeater 19a has a microprocessor 23a and an EDID memory 27a. The microprocessor 23a has memory control units 102a and 103a.

The repeater 19b has a microprocessor 23b and an EDID memory 27b. The microprocessor 23b has memory control units 102b and 103b.

The repeater 19c has a microprocessor 23c and an EDID memory 27c. The microprocessor 23c has memory control units 102c and 103c.

The microprocessor 5 of the set-top box 1 has a memory control unit 71.

The set-top box 1 and the repeater 19a are connected together by an IIC bus 36a, a power-on line 30a and a hot plug line 33a. The IIC bus 36a connects the memory control unit 71, the memory control unit 102a, and the EDID memory 27a. The power-on line 30a connects the microprocessors 5 and 23a together to indicate the state of the set-top box 1. The hot plug line 33a connects the microprocessors 5 and 23a together to indicate the state of the repeater 19a.

The repeaters 19a and 19b are connected together by an IIC bus 36b, a power-on line 30b and a hot plug line 33b. The IIC bus 36b connects the memory control unit 103a and the EDID memory 27b. The memory control unit 103b and the EDID memory 27b are connected together by a bus 36b'. Alternatively, the IIC bus 36b may connect the memory control units 103a and 102b and the EDID memory 27b. The power-on line 30b connects the microprocessors 23a and 23b together to indicate the state of the repeater 19a. The hot plug line 33b connects the microprocessors 23a and 23b together to indicate the state of the repeater 19b.

The repeaters 19b and 19c are connected together by an IIC bus 36c, a power-on line 30c and a hot plug line 33c. The IIC bus 36c connects the memory control unit 103b and the EDID memory 27c. The memory control unit 103c and the EDID memory 27c are connected together by a bus 36c'. Alternatively, the IIC bus 36c may connect the memory control units 103b and 102c and the EDID memory 27c. The power-on line 30c connects the microprocessors 23b and 23c together to indicate the state of the repeater 19b. The hot plug line 33c connects the microprocessors 23b and 23c together to indicate the state of the repeater 19c.

The repeater 19c and the television receiving device 2 are connected together by an IIC bus 36d, a power-on line 31d and a hot plug line 33d. The IIC bus 36d connects the memory control unit 103c and the EDID memory 8. The power-on line 31d connects the microprocessor 23c and the EDID memory 8 together to indicate the state of the repeater 19c. The hot plug line 33d connects the microprocessor 23C and the EDID memory 8 together to indicate the state of the television receiving device 2.

As in the example of FIG. 6, the EDID data including information concerning display attributes of the television receiving device 2 is stored in the EDID memory 8.

The control data stored in the EDID memory 8 is stored into the EDID memory 27c via the microprocessor 23c. Until the control data has been stored into the memory 27c, the microprocessor 23c continues to output an access inhibiting signal over the hot plug line 33c to the microprocessor 23b in the repeater 19b, thereby disabling the microprocessor 23b from making access to the control data in the EDID memory 27c.

After the microprocessor 23c has ceased outputting the access inhibiting signal, the microprocessor 23b in the repeater 19b commences making access to the control data in the EDID memory 27c. Thereby, the control data is transferred over the IIC bus 36c. The memory control unit 102b of the microprocessor 23b writes the transferred control data into the EDID memory 27b. Until the control data has been stored into the memory 27b, the microprocessor 23b continues to output an access inhibiting signal over the hot plug line 33b to the microprocessor 23a, thereby disabling the microprocessor 23a from making access to the control data in the EDID memory 27b.

After the microprocessor 23b has ceased outputting the access inhibiting signal, the microprocessor 23a commences making access to the control data in the EDID memory 27b. Thereby, the control data is transferred over the IIC bus 36b. The memory control unit 102a of the microprocessor 23a writes the transferred control data into the EDID memory 27a. Until the control data has been stored into the memory 27a, the microprocessor 23a continues to output an access inhibiting signal over the hot plug line 33a to the microprocessor 5 in the set-top box 1, thereby disabling that microprocessor 5 from making access to the control data in the EDID memory 27a.

After the microprocessor 23a has ceased outputting the access inhibiting signal, the microprocessor 5 in the set-top box 1 commences making access to the control data in the EDID memory 27a. Thereby, the control data is transferred over the IIC bus 36a to the microprocessor 5.

The microprocessor 5 sets a decoding mode in the tuner decoding unit 3 (not shown in FIG. 10) on the basis of the control data obtained by accessing the EDID memory 27a.

Thus, the readout of the control data from the television receiving device 2 and the establishment of a decoding mode are completed by the set-top box 1. After the establishment, data transmission based on the DVI, EDID and HDCP standards is made from the set-top box 1 through the repeaters 19a, 19b and 19c to the television receiving device 2.

In the example of FIG. 10 as well, access to the control data in the EDID memory 27a to 27c in the preceding stage by the microprocessor 5, 23a to 23c in the succeeding stage is prohibited until the control data has been stored into that EDID memory 27a to 27c.

Therefore, the control data stored in the EDID memory 8 in the television receiving device 2 will be correctly transferred to the set-top box 1 without being transferred in the middle of being stored into the memory in each repeater.

Although, in the example of FIG. 10, three repeaters are arranged between the graphics host and the television receiving device, the present embodiment is not limited to this. Any number of repeaters may be placed between the graphics host and the television receiving device.

Each repeater prohibits access to its built-in memory while control data is being stored into that memory. This prevents erroneous control data from being transferred to the decoder of the source device. The decoder of the source device can therefore decode a digital signal according to correct control data only. The decoder will therefore not malfunction.

According to the present embodiment, as described above, a set-top box or DVD player acting as a source device will not decode data according to settings that do not conform to the display attributes of the television receiving device.

What is claimed is:

1. A data relay device, provided between a sink unit, which stores EDID (Extended Display Identification Data) data representing display attributes and presents input data based on the EDID data, and a source device, comprising:
   an EDID memory configured to store the EDID data;
   a control unit configured to deactivate a hot plug line until the completion of storing the EDID data in the EDID memory and activate the hot plug line after the EDID data is stored in the EDID memory, whereby the source device can read the EDID data from the EDID memory via an I²C bus;
   a first data bus which transfers the EDID data from the display unit to the EDID memory; and
   a second data bus which transfers the read EDID data stored in the EDID memory to the source device,
   wherein the control unit has terminals connected to the second data bus to control the conduction/nonconduction of the second data bus according to the presence or absence of access to the EDID memory by the control unit.

* * * * *